United States Patent [19]

Shenk

[11] Patent Number: 4,894,794

[45] Date of Patent: Jan. 16, 1990

[54] SYSTEM FOR PROVIDING CONTINOUS LINEAR INTERPOLATION

[75] Inventor: Edwin K. Shenk, Westford, Mass.

[73] Assignee: Polaroid Corporation, Cambridge, Mass.

[21] Appl. No.: 787,639

[22] Filed: Oct. 15, 1985

[51] Int. Cl.[4] ............................................. G06F 7/38
[52] U.S. Cl. ................................................... 364/723
[58] Field of Search .................. 364/723; 358/37, 166, 358/284

[56] References Cited

U.S. PATENT DOCUMENTS

| | | | |
|---|---|---|---|
| 3,789,203 | 1/1974 | Catherall et al. | 364/723 |
| 3,902,011 | 8/1975 | Pieters et al. | 178/7.2 |
| 4,068,266 | 1/1978 | Liao | 358/280 |
| 4,153,912 | 5/1979 | Gold | 358/44 |
| 4,243,924 | 1/1981 | Onoda et al. | 364/723 |
| 4,275,413 | 6/1981 | Sakamoto et al. | 358/80 |
| 4,303,947 | 12/1981 | Stoffel | 358/260 |
| 4,437,122 | 3/1984 | Walsh et al. | 358/166 |
| 4,484,230 | 11/1984 | Pugsley | 358/284 |
| 4,528,639 | 7/1985 | Edwards | 364/723 |

*Primary Examiner*—Gary V. Harkcom
*Assistant Examiner*—Long T. Nguyen
*Attorney, Agent, or Firm*—Edward S. Roman

[57] ABSTRACT

A system for continuously linearly interpolating intermediary binary numbers operates to coordinate the transfer of binary numbers to a binary averager so as to provide output binary numbers equal to the average value of the input binary numbers during first and second time intervals wherein the average values provided during the second time intervals correspond to interpolated intermediary binary numbers.

8 Claims, 2 Drawing Sheets

SYSTEM FOR PROVIDING CONTINOUS LINEAR INTERPOLATION

BACKGROUND OF THE INVENTION

1. Field of the Invention

This invention relates generally to a system for providing continuous linear binary interpolation and, more particularly, to a system for continuously linearly interpolating intermediary binary numbers from a continuous stream of binary numbers.

2. Description of the Prior Art

Arrays of photoresponsive image receiving elements such as charge coupled devices (CCD's) are well known in the art for use in video cameras for converting a visual image into an ordered sequence of electrical signal amplitudes. In commercial color television, for example, where high quality images are required and where cost is not a significant limiting factor, optical elements split the incoming image and focus it onto three separate CCD arrays. Prior to reaching the CCD arrays, each split image optical signal passes through a filter having a different optical bandpass. Each CCD array then corresponds to and provides an electrical output representative of one of the three required color signals which together generate at the color display apparatus, e.g., a television receiver, the red, green and blue primary color signals which make up the color image. Currently available CCD arrays provide enough resolution so that a three array system can be used in commercial television applications in place of older equipment.

Charge coupled devices, however, are quite expensive and thus many approaches other than a three CCD array system have been tried to tap the consumer market for a solid state moderate cost video camera. Generally, each moderate cost approach uses a single CCD array masked with an optical filtering element. The filtering element may be, for example, a sequence of stripes or other repeating grid of filter elements having a plurality of different bands of image transmission wavelength ranges. These systems, however, incur a reduced resolution because the three different color signals which make up the eventually formed color image result from a single scan of the single CCD array. Therefore, the resolution offered by the single CCD array is reduced by a factor of three for each designated color signal.

Such CCD's comprise a plurality of discrete picture sensing elements or areas commonly referred to as pixels. The aforementioned light filtering elements may provide for each pixel to be filtered by a selected color filter thereby requiring that each color signal be derived from less than the full number of pixels available in the CCD array. Compensation may be provided by linearly interpolating color values for those pixels for which color values cannot be measured in a particular color. Most recently, it has been suggested that the analog signal amplitudes which define the color values sensed by the individual pixels be digitized prior to storage in a memory in order to more accurately reproduce the image. Such digitized electronic image data, however, does not readily lend itself to being linearly interpolated to provide intermediary color values for those pixels which sense colors other than the one being immediately processed.

Therefore, it is a primary object of this invention to provide a simple and economical system for continuously linearly interpolating intermediary binary data derived from a continuous stream of binary data.

It is a further object of this invention to provide a simple and economical system for continuously linearly interpolating intermediary binary numbers which define color values in a selected color for those pixel elements which do not provide output signals in that selected color.

Other objects of the invention will be in part obvious and will in part appear hereinafter. The invention accordingly comprises a mechanism and system possessing the construction, combination of elements and arrangement of parts which are exemplified in the following detailed disclosure.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

SUMMARY OF THE INVENTION

A system and method are provided for continuously linearly interpolating intermediary binary numbers from a continuous stream of binary numbers. The system comprises first and second registers for receiving and storing one binary number at a time from a continuous stream of binary numbers. Averaging means are connected to receive the output binary numbers from the first and second registers to provide an output binary number equal to the average value of the binary numbers received from the first and second registers. Means are provided for strobing the first register so that the first register sequentially receives for storage therein binary numbers one at a time from the continuous stream of binary numbers and simultaneously outputs the stored binary number therefrom to the averaging means. Means are also provided for strobing the second register so that the second register sequentially receives for storage therein binary numbers one at a time from the continuous stream of binary numbers and simultaneously outputs the binary numbers therefrom to said averaging means. The first and second strobing means are coordinated with respect to each other so that each of the binary numbers from the continuous stream of binary numbers are simultaneously stored by both the first and second registers during each respective one of a plurality of first succeeding time intervals and each pair of adjacent binary numbers from the continuous stream of binary numbers are stored respectively by the first and second registers during each respective one of a plurality of second time intervals alternating with the first time intervals. The averaging means operates to provide output binary numbers equal to the average value of the stored binary numbers during the first and second intervals, respectively, wherein the average values provided during the second intervals correspond to interpolated binary numbers.

DESCRIPTION OF THE PREFERRED EMBODIMENT

Figure 1:
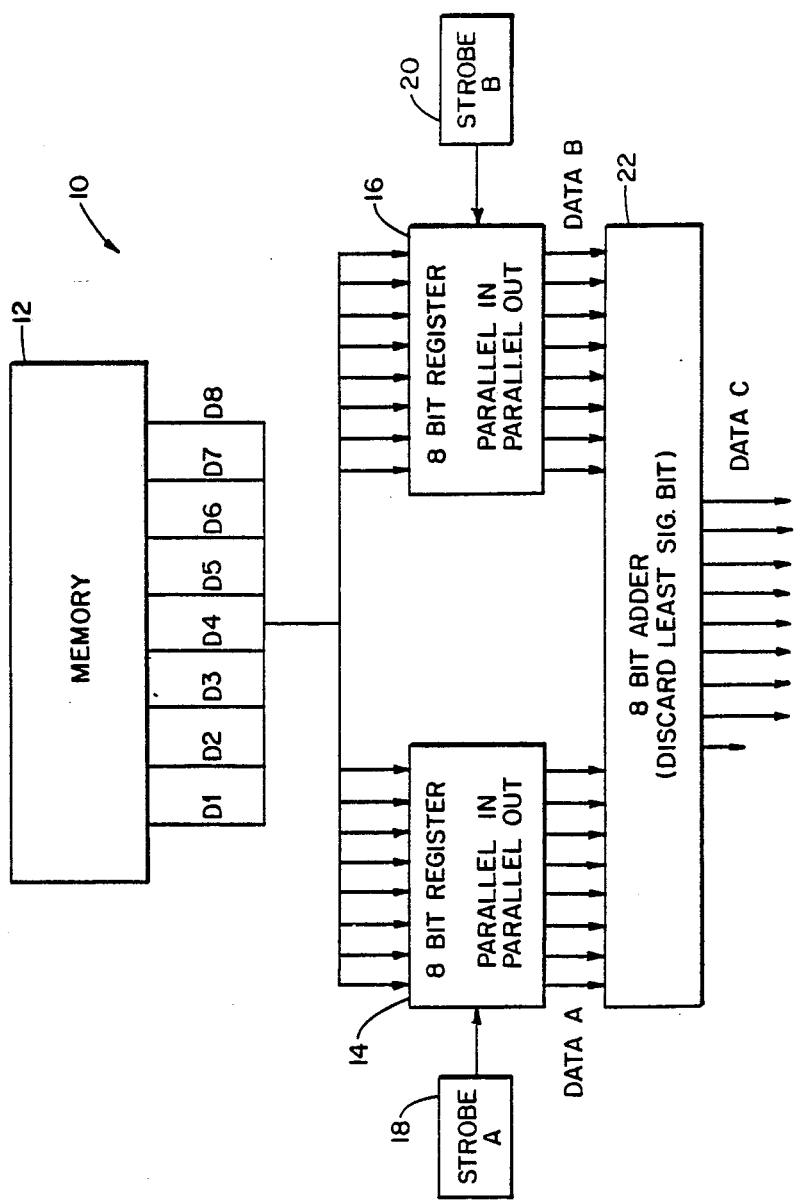
FIG. 1 is a block diagram for the linear interpolation system of this invention.

Referring now to FIG. 1 there is shown at 10 a block diagram for the system of this invention which continuously linearly interpolates for intermediary binary numbers from a continous stream of binary numbers. As previously discussed, arrays of image receiving elements, in particular charge coupled devices (CCD's), sense image data and provide output analog signal values corresponding to each pixel of the image so sensed. Each analog signal value for each pixel of the sensed image may thereafter be converted in a well-known manner to a binary number for storage in a memory as shown at 12. The memory 12 may comprise any appropriate magnetic storage medium such as magnetic tape or floppy disk. Alternatively, other well-known memory storage mediums or devices may be utilized.

As previously discussed, CCD's of the aforementioned type in order to provide color image data are masked with optical filtering elements which, for example, may comprise a sequence of stripes or other repeating grid of filter elements having a plurality of different bands of image transmission wavelength ranges. Since color imaging requires three different color signals to eventually form the color image, the resolution offered by a single CCD array is reduced in each color sensed. The binary image data stored in the memory 12 comprises an 8 bit binary number for each pixel of the image so sensed, and as is now readily apparent the 8 bit binary number for each pixel of the image defines a single color value for that pixel. Thus, each adjacent pixel may sense a different color, and for each color sensed, intermediate pixel values must be interpolated in order to provide full resolution image data for that color. It is toward solving the aforementioned linear interpolation problem that the system of this invention for continuously linearly interpolating intermediary binary numbers is directed.

The memory 12 provides a continuous stream of 8 bit binary numbers as shown from D1–D8. Each binary number from the memory 12 is directed to the input of a first parallel shift register 14 and a second parallel shift register 16. Binary data is clocked into the parallel shift register 14 by a strobe A 18 while in like manner binary data is clocked into the parallel shift register 16 by another strobe B 20. The binary data stored in the parallel shift registers 14 and 16, in turn, is directed to input an adder 22 which operates to add the binary numbers and provide an output binary number equal to the sum of the input binary numbers divided by two. The division by two is accomplished by the adder 22 in a well-known manner simply by discarding the least significant bit of the data C as shown.

Figure 2:
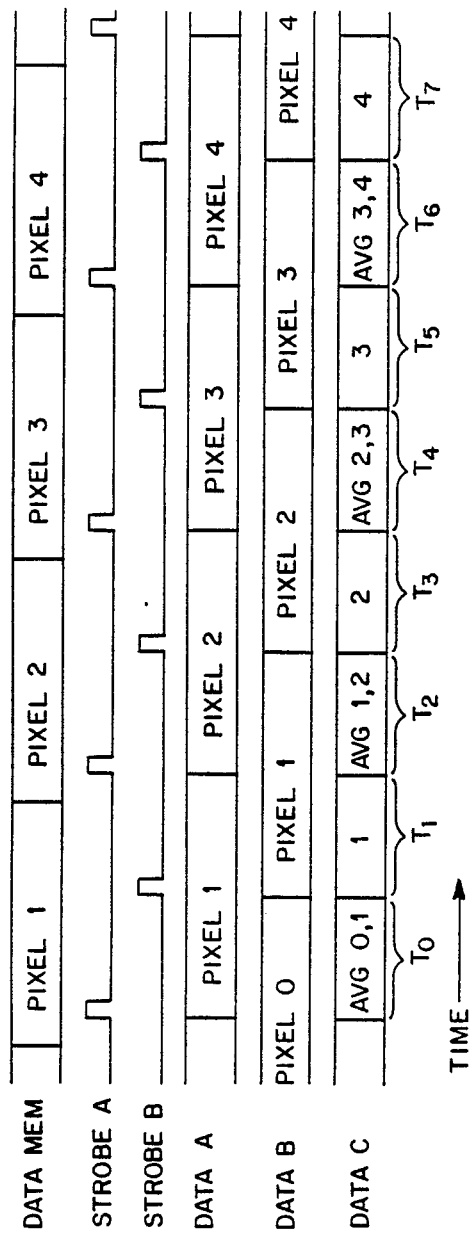
FIG. 2 is a timing diagram showing the sequence of data processing for the linear interpolation system of FIG. 1.

Referring now to FIG. 2 in conjunction with FIG. 1, there is shown the timing sequence by which the binary data is clocked through the parallel shift registers 14 and 16 to provide the continuous linear interpolation of this invention. Referring to the line entitled "DATA MEM" of FIG. 2 there is shown in real time a continuous stream of binary numbers furnished from the memory 12 to the parallel shift registers 14 and 16. As previously discussed, each 8 bit binary number D1–D8 defines a color value for one pixel. Thus, the continuous stream of binary numbers define respective color values for the continuous stream of pixels 1–4 as shown in the line entitled "DATA MEM" of FIG. 2. It will now be well understood that since the color values defined by the binary numbers are for only one of the colors that may be sensed, then pixels 1, 2, 3 and 4 are not adjacent pixels but have intermediary pixels therebetween for which values of that one color are to be interpolated in the manner of this invention.

The following lines entitled "STROBE A" and "STROBE B" show the clocking signals by which binary data is clocked from the memory 12 to the parallel shift registers 14 and 16, respectively. The strobe A 18 clocks binary numbers to the parallel shift register 14 so as to provide output binary data as shown by the line entitled "DATA A" in FIG. 2. In like manner the strobe B 20 clocks binary numbers from the memory 12 to the parallel shift register 16 so as to provide output binary data as shown by the line entitled "DATA B" of FIG. 2. Now, it can be seen that the strobes A and B are coordinated with respect to each other so that each of the binary numbers which defines a color value for one of the pixels is simultaneously stored by both of the parallel shift registers 14 and 16 during each respective one of a plurality of first succeeding time intervals as shown at $T_1$, $T_3$, $T_5$ and $T_7$. Each pair of adjacent binary numbers are also stored, respectively, by the parallel shift registers 14 and 16 during each respective one of a plurality of second time intervals as shown at $T_0$, $T_2$, $T_4$ and $T_6$ alternating with respect to said first time intervals.

Thus, as is readily apparent, parallel shift register 16 stores the binary number which defines the color value for pixel 0 during the same time interval $T_0$ that the parallel shift register 14 stores the binary number which defines the color value for pixel 1. Strobe B hereafter provides the clocking pulse as shown at the end of the time interval $T_0$ to clock the binary number which defines the color value for pixel 1 into the parallel shift register 16. For the next succeeding time interval $T_1$ parallel shift registers 14 and 16 simultaneously store binary numbers which define the color value of pixel 1. At the end of the time interval $T_1$ strobe A provides a clock pulse to input the parallel shift register 14 with the binary number corresponding to the color value of pixel 2. Thus, during the next succeeding time interval $T_2$ the parallel shift register 14 stores the binary number defining the color value for pixel 2 while the parallel shift register 16 stores the binary number defining the color value for the pixel 1. The strobe B thereafter provides a clock pulse at the end of the time interval $T_2$ to load the binary number which defines the color value for pixel 2 into the parallel shift register 16. As is readily apparent, this process continues in the aforementioned manner.

The adder 22 receives the binary number outputs from the parallel shift registers 14 and 16 and provides an output signal corresponding to the average value of the input binary numbers. The averaging is accomplished by adding the binary input numbers to provide an 8 bit binary output number in which the least significant bit is discarded. As is readily understood, discarding the least significant bit provides the divide by two function required for averaging two input numbers. Referring now to the line entitled "DATA C" of FIG. 2, there is shown the timing sequence for the output binary numbers from the adder 22. Thus, during the first time interval $T_0$, the adder 22 provides an output binary number which defines an average color value between pixel 0 and pixel 1. This average color value is a linear interpolated value for the intermediary pixel that exists between pixel 0 and pixel 1 for which a specific color value in the particular color currently being processed cannot be measured. During the next succeeding time interval $T_1$, the adder 22 averages the output binary numbers from the parallel shift registers 14 and 16, both of which define the color value for pixel 1, so as to provide an average output binary number which defines the color value of pixel 1. During the next succeeding time interval $T_2$, the adder 22 averages the output binary number from the parallel shift register 14 which defines the color value for pixel 2 with the output binary number from the parallel shift register 16 which defines the color value for the pixel 1 to provide an output binary number which corresponds to the average color value between pixels 1 and 2. Thus, a color value is linearly interpolated for an intermediary pixel between the pixels 1 and 2 which cannot be directly sensed in the particular color currently being processed. In this manner, the adder 22 operates to provide output binary numbers which define the color value of each pixel wherein the alternate binary numbers define interpolated color values, respectively, between adjacent pixels.

Although the linear interpolating system of this invention has been described in relation to interpolating image data for intermediary pixels that cannot be directly measured in a particular color, it will be readily apparent that the interpolation system of this invention is by no means so limited and may be utilized to linearly interpolate any binary data in a simple and economical manner.

Other embodiments of the invention including additions, subtractions, deletions and other modifications of the preferred disclosed embodiments of the invention will be obvious to those skilled in the art and are within the scope of the following claims.

What is claimed is:

1. A system for continuously linearly interpolating intermediary binary numbers from a continuous stream of binary numbers, said system comprising:
   a first register for receiving and storing one binary number at a time from the continuous stream of binary numbers;
   a second register for receiving and storing one binary number at a time from the continuous stream of binary numbers;
   averaging means connected to receive output binary numbers from said first and second registers for providing an output binary number equal to the average value of the binary numbers received from said first and second registers;
   first means for strobing said first register so that said first register sequentially receives for storage therein binary numbers one at a time from said continuous stream of binary numbers and simultaneously outputs the stored binary number therefrom to said averaging means; and
   second means for strobing said second register so that said second register sequentially receives for storage therein binary numbers one at a time from said continuous stream of binary numbers and simultaneously outputs the stored binary number therefrom to said averaging means, said first and second strobing means being coordinated with respect to each other so that each of said binary numbers from the continuous stream of binary numbers is simultaneously stored by both of said first and second registers during each respective one of a plurality of first succeeding time intervals and each pair of adjacent binary numbers from the continuous stream of binary numbers is stored, respectively, by said first and second registers during each respective one of a plurality of second time intervals alternating with said first time intervals, said averaging means operating to provide output binary numbers equal to the average value of said stored binary numbers during said first and second intervals, respectively, wherein the average values provided during said second intervals correspond to interpolated binary numbers.

2. The system of claim 1 wherein said averaging means comprises an adder circuit from which the least significant bit at the output therefrom is discarded.

3. The system of claim 2 wherein said binary numbers from the stream of binary numbers define, respectively, values for measurable pixels of an image and said average values of said adjacent binary numbers define, respectively, interpolated values for non-measurable pixels of an image.

4. The system of claim 2 wherein said first and second registers comprise parallel shift registers in which the binary numbers are parallel shifted therethrough.

5. A method for continuously linearly interpolating intermediary binary numbers from a continuous stream of binary numbers comprising the steps of:
   sequentially storing binary numbers one at a time from the continuous stream of binary numbers at first and second registers, respectively, and coordinating the storage so that each of said binary numbers from the continuous stream of binary numbers is simultaneously stored by both of the first and second registers during each respective one of a plurality of first succeeding time intervals and each pair of adjacent binary numbers from the continuous stream of binary numbers is stored, respectively, by the first and second registers during each respective one of a plurality of second time intervals alternating with said first intervals; and
   averaging the binary numbers stored by said first and second registers to provide output binary numbers equal to the average value of said stored binary numbers during said first and second time intervals, respectively, said average values provided during said second intervals corresponding to interpolated binary numbers.

6. The method of claim 5 wherein said averaging step comprises adding the binary numbers stored by said first and second registers and thereafter discarding the least significant bit from the output binary number.

7. The method of claim 6 comprising the additional steps of:
   deriving said continuous stream of binary numbers from image data corresponding to values for measurable pixels from an image to be reproduced; and
   assigning said interpolated binary words to provide values to corresponding intermediate pixels of the image which are non-measurable.

8. The method of claim 6 comprising the additional step of parallel shifting the binary numbers through said registers.

* * * * *